US007898519B2

(12) United States Patent
Feng

(10) Patent No.: US 7,898,519 B2
(45) Date of Patent: Mar. 1, 2011

(54) METHOD FOR OVERDRIVING A BACKLIT DISPLAY

(75) Inventor: Xiao-Fan Feng, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 830 days.

(21) Appl. No.: 11/219,888

(22) Filed: Sep. 6, 2005

(65) Prior Publication Data

US 2006/0181503 A1 Aug. 17, 2006

Related U.S. Application Data

(60) Provisional application No. 60/653,912, filed on Feb. 17, 2005, provisional application No. 60/694,483, filed on Jun. 27, 2005.

(51) Int. Cl.

| | |
|---|---|
| ***G09G 3/36*** | (2006.01) |
| ***G09G 5/00*** | (2006.01) |
| ***G06F 3/038*** | (2006.01) |

(52) U.S. Cl. ............................ 345/102; 345/89; 345/204

(58) Field of Classification Search .................. 345/690, 345/103, 89, 204

See application file for complete search history.

(56) References Cited

U.S. PATENT DOCUMENTS

| | | | |
|---|---|---|---|
| 3,329,474 | A | 7/1967 | Harris et al. |
| 3,375,052 | A | 3/1968 | Kosanke et al. |
| 3,428,743 | A | 2/1969 | Hanlon |
| 3,439,348 | A | 4/1969 | Harris et al. |
| 3,499,700 | A | 3/1970 | Harris et al. |
| 3,503,670 | A | 3/1970 | Kosanke et al. |
| 3,554,632 | A | 1/1971 | Chitayat |
| 3,947,227 | A | 3/1976 | Granger et al. |
| 4,012,116 | A | 3/1977 | Yevick |
| 4,110,794 | A | 8/1978 | Lester et al. |
| 4,170,771 | A | 10/1979 | Bly |
| 4,187,519 | A | 2/1980 | Vitols et al. |
| 4,384,336 | A | 5/1983 | Frankle et al. |
| 4,385,806 | A | 5/1983 | Fergason |
| 4,410,238 | A | 10/1983 | Hanson |
| 4,441,791 | A | 4/1984 | Hornbeck |

(Continued)

FOREIGN PATENT DOCUMENTS

EP 0 732 669 A1 9/1996

(Continued)

OTHER PUBLICATIONS

A.A.S. Sluyterman and E.P. Boonekamp, "Architectural Choices in a Scanning Backlight for Large LCD TVs," 18.2 SID 05 Digest, 2005, ISSN/0005-0966X/05/3602-0996, pp. 996-999, Philips Lighting, Eindhoven, The Netherlands.

(Continued)

*Primary Examiner* — Sumati Lefkowitz
*Assistant Examiner* — Jonathan Horner
(74) *Attorney, Agent, or Firm* — Chernoff, Vilhauer, McClung & Stenzel

(57) ABSTRACT

A backlight display has improved display characteristics. An image is displayed on the display which includes a liquid crystal material with a light valve. The display receives an image signal, modifies the light valve with an overdrive for a first region of the image based upon the timing of the illumination of the region, and modifies the light valve with an overdrive for a second region of the image based upon the timing of the illumination of the second region.

7 Claims, 13 Drawing Sheets

Measured LCD display value as a function of previous display value and driving value

U.S. PATENT DOCUMENTS

| | | | | | |
|---|---|---|---|---|---|
| 4,516,837 | A | | 5/1985 | Soref et al. | |
| 4,540,243 | A | | 9/1985 | Fergason | |
| 4,562,433 | A | | 12/1985 | Biferno | |
| 4,574,364 | A | | 3/1986 | Tabata et al. | |
| 4,611,889 | A | | 9/1986 | Buzak | |
| 4,648,691 | A | | 3/1987 | Oguchi et al. | |
| 4,649,425 | A | | 3/1987 | Pund | |
| 4,682,270 | A | | 7/1987 | Whitehead et al. | |
| RE32,521 | E | | 10/1987 | Fergason | |
| 4,715,010 | A | | 12/1987 | Inoue et al. | |
| 4,719,507 | A | | 1/1988 | Bos | |
| 4,755,038 | A | | 7/1988 | Baker | |
| 4,758,818 | A | | 7/1988 | Vatne | |
| 4,766,430 | A | | 8/1988 | Gillette et al. | |
| 4,834,500 | A | | 5/1989 | Hilsum et al. | |
| 4,862,270 | A | | 8/1989 | Nishio | |
| 4,862,496 | A | | 8/1989 | Kelly et al. | |
| 4,885,783 | A | | 12/1989 | Whitehead et al. | |
| 4,888,690 | A | | 12/1989 | Huber | |
| 4,910,413 | A | | 3/1990 | Tamune | |
| 4,917,452 | A | | 4/1990 | Liebowitz | |
| 4,918,534 | A | | 4/1990 | Lam et al. | |
| 4,933,754 | A | | 6/1990 | Reed et al. | |
| 4,954,789 | A | | 9/1990 | Sampsell | |
| 4,958,915 | A | | 9/1990 | Okada et al. | |
| 4,969,717 | A | | 11/1990 | Mallinsoh | |
| 4,981,838 | A | | 1/1991 | Whitehead | |
| 4,991,924 | A | | 2/1991 | Shankar et al. | |
| 5,012,274 | A | | 4/1991 | Dolgoff | |
| 5,013,140 | A | | 5/1991 | Healey et al. | |
| 5,074,647 | A | | 12/1991 | Fergason et al. | |
| 5,075,789 | A | | 12/1991 | Jones et al. | |
| 5,083,199 | A | | 1/1992 | Borner | |
| 5,122,791 | A | | 6/1992 | Gibbons et al. | |
| 5,128,782 | A | | 7/1992 | Wood | |
| 5,138,449 | A | | 8/1992 | Kerpchar | |
| 5,144,292 | A | | 9/1992 | Shiraishi et al. | |
| 5,164,829 | A | | 11/1992 | Wada | |
| 5,168,183 | A | | 12/1992 | Whitehead | |
| 5,187,603 | A | | 2/1993 | Bos | |
| 5,202,897 | A | | 4/1993 | Whitehead | |
| 5,206,633 | A | | 4/1993 | Zalph | |
| 5,214,758 | A | | 5/1993 | Ohba et al. | |
| 5,222,209 | A | | 6/1993 | Murata et al. | |
| 5,224,178 | A | | 6/1993 | Madden et al. | |
| 5,247,366 | A | | 9/1993 | Ginosar et al. | |
| 5,256,676 | A | | 10/1993 | Hider et al. | |
| 5,293,258 | A | | 3/1994 | Dattilo | |
| 5,300,942 | A | | 4/1994 | Dolgoff | |
| 5,305,146 | A | | 4/1994 | Nakagaki et al. | |
| 5,311,217 | A | | 5/1994 | Guerin et al. | |
| 5,313,225 | A | | 5/1994 | Miyadera | |
| 5,313,454 | A | | 5/1994 | Bustini et al. | |
| 5,317,400 | A | | 5/1994 | Gurley et al. | |
| 5,337,068 | A | * | 8/1994 | Stewart et al. .................. | 345/88 |
| 5,339,382 | A | | 8/1994 | Whitehead | |
| 5,357,369 | A | | 10/1994 | Pilling et al. | |
| 5,359,345 | A | | 10/1994 | Hunter | |
| 5,369,266 | A | | 11/1994 | Nohda et al. | |
| 5,369,432 | A | | 11/1994 | Kennedy | |
| 5,386,253 | A | | 1/1995 | Fielding | |
| 5,394,195 | A | | 2/1995 | Herman | |
| 5,395,755 | A | | 3/1995 | Thorpe et al. | |
| 5,416,496 | A | | 5/1995 | Wood | |
| 5,422,680 | A | | 6/1995 | Lagoni et al. | |
| 5,426,312 | A | | 6/1995 | Whitehead | |
| 5,436,755 | A | | 7/1995 | Gueria | |
| 5,450,498 | A | | 9/1995 | Whitehead | |
| 5,456,255 | A | | 10/1995 | Abe et al. | |
| 5,461,397 | A | | 10/1995 | Zhang | |
| 5,471,225 | A | | 11/1995 | Parks | |
| 5,471,228 | A | | 11/1995 | Ilcisin et al. | |
| 5,477,274 | A | | 12/1995 | Akiyoshi | |
| 5,481,637 | A | | 1/1996 | Whitehead | |
| 5,537,128 | A | | 7/1996 | Keene et al. | |
| 5,570,210 | A | | 10/1996 | Yoshida et al. | |
| 5,579,134 | A | | 11/1996 | Lengyel | |
| 5,580,791 | A | | 12/1996 | Thorpe et al. | |
| 5,592,193 | A | | 1/1997 | Chen | |
| 5,617,112 | A | | 4/1997 | Yoshida et al. | |
| 5,642,015 | A | | 6/1997 | Whitehead et al. | |
| 5,642,128 | A | | 6/1997 | Inoue | |
| D381,355 | S | | 7/1997 | Frank-Braun | |
| 5,650,880 | A | | 7/1997 | Shuter et al. | |
| 5,652,672 | A | | 7/1997 | Huignard et al. | |
| 5,661,839 | A | | 8/1997 | Whitehead | |
| 5,682,075 | A | | 10/1997 | Bolleman et al. | |
| 5,684,354 | A | | 11/1997 | Gleckman | |
| 5,689,283 | A | | 11/1997 | Shirochi | |
| 5,715,347 | A | | 2/1998 | Whitehead | |
| 5,717,421 | A | * | 2/1998 | Katakura et al. .............. | 345/101 |
| 5,717,422 | A | | 2/1998 | Fergason | |
| 5,729,242 | A | | 3/1998 | Margerum et al. | |
| 5,748,164 | A | | 5/1998 | Handschy et al. | |
| 5,751,264 | A | | 5/1998 | Cavallerano et al. | |
| 5,754,159 | A | | 5/1998 | Wood et al. | |
| 5,767,828 | A | | 6/1998 | McKnight | |
| 5,767,837 | A | | 6/1998 | Hara | |
| 5,774,599 | A | | 6/1998 | Muka et al. | |
| 5,784,181 | A | | 7/1998 | Loiseaux et al. | |
| 5,796,382 | A | | 8/1998 | Beeteson | |
| 5,809,169 | A | | 9/1998 | Rezzouk et al. | |
| 5,854,662 | A | | 12/1998 | Yuyama et al. | |
| 5,886,681 | A | | 3/1999 | Walsh et al. | |
| 5,889,567 | A | | 3/1999 | Swanson et al. | |
| 5,892,325 | A | | 4/1999 | Gleckman | |
| 5,901,266 | A | | 5/1999 | Whitehead | |
| 5,905,503 | A | * | 5/1999 | Penna ........................... | 345/426 |
| 5,912,651 | A | | 6/1999 | Bitzakidis et al. | |
| 5,939,830 | A | | 8/1999 | Praiswater | |
| 5,940,057 | A | | 8/1999 | Lien et al. | |
| 5,959,777 | A | | 9/1999 | Whitehead | |
| 5,969,704 | A | | 10/1999 | Green et al. | |
| 5,978,142 | A | | 11/1999 | Blackham et al. | |
| 5,986,628 | A | | 11/1999 | Tuenge et al. | |
| 5,991,456 | A | | 11/1999 | Rahman et al. | |
| 5,995,070 | A | | 11/1999 | Kitada | |
| 5,999,307 | A | | 12/1999 | Whitehead et al. | |
| 6,008,929 | A | | 12/1999 | Akimoto et al. | |
| 6,024,462 | A | | 2/2000 | Whitehead | |
| 6,025,583 | A | | 2/2000 | Whitehead | |
| 6,043,591 | A | | 3/2000 | Gleckman | |
| 6,050,704 | A | | 4/2000 | Park | |
| 6,064,784 | A | | 5/2000 | Whitehead et al. | |
| 6,067,645 | A | | 5/2000 | Yamamoto et al. | |
| 6,079,844 | A | | 6/2000 | Whitehead et al. | |
| 6,111,559 | A | | 8/2000 | Motomura et al. | |
| 6,111,622 | A | | 8/2000 | Abileah | |
| 6,120,588 | A | | 9/2000 | Jacobson | |
| 6,120,839 | A | | 9/2000 | Comiskey et al. | |
| 6,129,444 | A | | 10/2000 | Tognoni | |
| 6,160,595 | A | | 12/2000 | Kishimoto | |
| 6,172,798 | B1 | | 1/2001 | Albert et al. | |
| 6,211,851 | B1 | | 4/2001 | Lien et al. | |
| 6,215,920 | B1 | | 4/2001 | Whitehead et al. | |
| 6,232,948 | B1 | | 5/2001 | Tsuchi | |
| 6,243,068 | B1 | | 6/2001 | Evanicky et al. | |
| 6,267,850 | B1 | | 7/2001 | Bailey et al. | |
| 6,268,843 | B1 | | 7/2001 | Arakawa | |
| 6,276,801 | B1 | | 8/2001 | Fielding | |
| 6,300,931 | B1 | | 10/2001 | Someya et al. | |
| 6,300,932 | B1 | | 10/2001 | Albert | |
| 6,304,365 | B1 | | 10/2001 | Whitehead | |
| 6,323,455 | B1 | | 11/2001 | Bailey et al. | |
| 6,323,989 | B1 | | 11/2001 | Jacobson et al. | |
| 6,327,072 | B1 | | 12/2001 | Comiskey et al. | |
| RE37,594 | E | | 3/2002 | Whitehead | |
| 6,359,662 | B1 | | 3/2002 | Walker | |
| 6,377,383 | B1 | | 4/2002 | Whitehead et al. | |
| 6,384,979 | B1 | | 5/2002 | Whitehead et al. | |
| 6,400,436 | B1 | | 6/2002 | Komatsu | |
| 6,414,664 | B1 | | 7/2002 | Conover et al. | |
| 6,418,253 | B2 | | 7/2002 | Whitehead | |
| 6,424,369 | B1 | | 7/2002 | Adair et al. | |
| 6,428,189 | B1 | | 8/2002 | Hochstein | |
| 6,435,654 | B1 | | 8/2002 | Wang et al. | |
| 6,437,921 | B1 | | 8/2002 | Whitehead | |

| | | | | |
|---|---|---|---|---|
| 6,439,731 | B1 | 8/2002 | Johnson et al. | |
| 6,448,944 | B2 | 9/2002 | Ronzani et al. | |
| 6,448,951 | B1 * | 9/2002 | Sakaguchi et al. | 345/88 |
| 6,448,955 | B1 | 9/2002 | Evanicky et al. | |
| 6,452,734 | B1 | 9/2002 | Whitehead et al. | |
| 6,483,643 | B1 | 11/2002 | Zuchowski | |
| 6,507,327 | B1 | 1/2003 | Atherton et al. | |
| 6,545,677 | B2 | 4/2003 | Brown | |
| 6,559,827 | B1 | 5/2003 | Mangerson | |
| 6,573,928 | B1 | 6/2003 | Jones et al. | |
| 6,574,025 | B2 | 6/2003 | Whitehead et al. | |
| 6,590,561 | B1 | 7/2003 | Kabel et al. | |
| 6,597,339 | B1 | 7/2003 | Ogawa | |
| 6,608,614 | B1 | 8/2003 | Johnson | |
| 6,624,828 | B1 | 9/2003 | Dresevic et al. | |
| 6,657,607 | B1 | 12/2003 | Evanicky et al. | |
| 6,680,834 | B2 | 1/2004 | Williams | |
| 6,690,383 | B1 | 2/2004 | Braudaway et al. | |
| 6,697,110 | B1 | 2/2004 | Jaspers et al. | |
| 6,700,559 | B1 | 3/2004 | Tanaka et al. | |
| 6,753,876 | B2 | 6/2004 | Brooksby et al. | |
| 6,788,280 | B2 | 9/2004 | Ham | |
| 6,791,520 | B2 | 9/2004 | Choi | |
| 6,803,901 | B1 | 10/2004 | Numao | |
| 6,816,141 | B1 | 11/2004 | Fergason | |
| 6,816,142 | B2 | 11/2004 | Oda et al. | |
| 6,816,262 | B1 | 11/2004 | Slocum et al. | |
| 6,828,816 | B2 | 12/2004 | Ham | |
| 6,834,125 | B2 | 12/2004 | Woodell et al. | |
| 6,846,098 | B2 | 1/2005 | Bourdelais et al. | |
| 6,856,449 | B2 | 2/2005 | Winkler et al. | |
| 6,862,012 | B1 | 3/2005 | Funakoshi et al. | |
| 6,864,916 | B1 | 3/2005 | Nayar et al. | |
| 6,885,369 | B2 | 4/2005 | Tanahashi et al. | |
| 6,891,672 | B2 | 5/2005 | Whitehead et al. | |
| 6,900,796 | B2 | 5/2005 | Yasunishi et al. | |
| 6,932,477 | B2 | 8/2005 | Stanton | |
| 6,954,193 | B1 | 10/2005 | Andrade et al. | |
| 6,975,369 | B1 | 12/2005 | Burkholder | |
| 7,002,546 | B1 | 2/2006 | Stuppi et al. | |
| 7,113,163 | B2 | 9/2006 | Nitta et al. | |
| 7,113,164 | B1 | 9/2006 | Kurihara | |
| 7,123,222 | B2 | 10/2006 | Borel et al. | |
| 7,161,577 | B2 | 1/2007 | Hirakata et al. | |
| 7,164,284 | B2 * | 1/2007 | Pan et al. | 324/770 |
| 2001/0005192 | A1 | 6/2001 | Walton et al. | |
| 2001/0013854 | A1 | 8/2001 | Ogoro | |
| 2001/0024199 | A1 | 9/2001 | Hughes | |
| 2001/0035853 | A1 | 11/2001 | Hoelen et al. | |
| 2001/0038736 | A1 | 11/2001 | Whitehead | |
| 2001/0048407 | A1 | 12/2001 | Yasunishi et al. | |
| 2001/0052897 | A1 | 12/2001 | Nakano et al. | |
| 2002/0003520 | A1 | 1/2002 | Aoki | |
| 2002/0003522 | A1 * | 1/2002 | Baba et al. | 345/89 |
| 2002/0008694 | A1 | 1/2002 | Miyachi et al. | |
| 2002/0033783 | A1 | 3/2002 | Koyama | |
| 2002/0036650 | A1 | 3/2002 | Kasahara et al. | |
| 2002/0044116 | A1 | 4/2002 | Tagawa et al. | |
| 2002/0057238 | A1 | 5/2002 | Nitta et al. | |
| 2002/0057253 | A1 | 5/2002 | Lim et al. | |
| 2002/0063963 | A1 | 5/2002 | Whitehead et al. | |
| 2002/0067325 | A1 | 6/2002 | Choi | |
| 2002/0067332 | A1 * | 6/2002 | Hirakata et al. | 345/102 |
| 2002/0070914 | A1 | 6/2002 | Bruning et al. | |
| 2002/0093521 | A1 | 7/2002 | Daly et al. | |
| 2002/0105709 | A1 | 8/2002 | Whitehead et al. | |
| 2002/0135553 | A1 | 9/2002 | Nagai et al. | |
| 2002/0149574 | A1 | 10/2002 | Johnson et al. | |
| 2002/0149575 | A1 | 10/2002 | Moon | |
| 2002/0154088 | A1 | 10/2002 | Nishimura | |
| 2002/0159002 | A1 | 10/2002 | Chang | |
| 2002/0159692 | A1 | 10/2002 | Whitehead | |
| 2002/0162256 | A1 | 11/2002 | Wardle et al. | |
| 2002/0171617 | A1 | 11/2002 | Fuller | |
| 2002/0175907 | A1 | 11/2002 | Sekiya et al. | |
| 2002/0180733 | A1 | 12/2002 | Colmenarez et al. | |
| 2002/0190940 | A1 | 12/2002 | Itoh et al. | |
| 2003/0012448 | A1 | 1/2003 | Kimmel et al. | |
| 2003/0026494 | A1 | 2/2003 | Woodell et al. | |
| 2003/0043394 | A1 | 3/2003 | Kuwata et al. | |
| 2003/0048393 | A1 | 3/2003 | Sayag | |
| 2003/0053689 | A1 | 3/2003 | Watanabe et al. | |
| 2003/0072496 | A1 | 4/2003 | Woodell et al. | |
| 2003/0090455 | A1 | 5/2003 | Daly | |
| 2003/0107538 | A1 | 6/2003 | Asao et al. | |
| 2003/0108245 | A1 | 6/2003 | Gallagher et al. | |
| 2003/0112391 | A1 | 6/2003 | Jang et al. | |
| 2003/0128337 | A1 | 7/2003 | Jaynes et al. | |
| 2003/0132905 | A1 | 7/2003 | Lee et al. | |
| 2003/0142118 | A1 | 7/2003 | Funamoto et al. | |
| 2003/0169247 | A1 * | 9/2003 | Kawabe et al. | 345/204 |
| 2003/0179221 | A1 | 9/2003 | Nitta et al. | |
| 2003/0197709 | A1 | 10/2003 | Shimazaki et al. | |
| 2003/0218591 | A1 * | 11/2003 | Shen et al. | 345/89 |
| 2003/0231158 | A1 * | 12/2003 | Someya et al. | 345/101 |
| 2004/0012551 | A1 * | 1/2004 | Ishii | 345/87 |
| 2004/0041782 | A1 | 3/2004 | Tachibana | |
| 2004/0051724 | A1 | 3/2004 | Elliott et al. | |
| 2004/0057017 | A1 | 3/2004 | Childers et al. | |
| 2004/0239587 | A1 | 12/2004 | Murata et al. | |
| 2004/0263450 | A1 | 12/2004 | Lee et al. | |
| 2005/0030302 | A1 * | 2/2005 | Nishi et al. | 345/204 |
| 2005/0073495 | A1 | 4/2005 | Harbers et al. | |
| 2005/0088403 | A1 | 4/2005 | Yamazaki | |
| 2005/0157298 | A1 | 7/2005 | Evanicky et al. | |
| 2005/0190164 | A1 | 9/2005 | Velthoven et al. | |
| 2005/0200295 | A1 | 9/2005 | Lim et al. | |
| 2005/0225525 | A1 * | 10/2005 | Wu et al. | 345/89 |
| 2005/0225561 | A1 | 10/2005 | Higgins et al. | |
| 2005/0225574 | A1 | 10/2005 | Brown et al. | |
| 2005/0259064 | A1 | 11/2005 | Sugino et al. | |
| 2006/0071936 | A1 | 4/2006 | Leyvi et al. | |
| 2006/0104508 | A1 | 5/2006 | Daly et al. | |
| 2006/0120598 | A1 | 6/2006 | Takahashi et al. | |
| 2006/0208998 | A1 | 9/2006 | Okishiro et al. | |
| 2007/0052636 | A1 | 3/2007 | Kalt et al. | |
| 2008/0025634 | A1 | 1/2008 | Border et al. | |
| 2008/0088560 | A1 | 4/2008 | Bae et al. | |

FOREIGN PATENT DOCUMENTS

| | | | |
|---|---|---|---|
| EP | 0 829 747 | A1 | 3/1998 |
| EP | 0 606 162 | B1 | 11/1998 |
| EP | 0912047 | | 4/1999 |
| EP | 0 963 112 | A1 | 12/1999 |
| EP | 1168243 | | 1/2002 |
| EP | 1 202 244 | A1 | 5/2002 |
| EP | 1 206 130 | A1 | 5/2002 |
| EP | 1 313 066 | A1 | 5/2003 |
| EP | 1 316 919 | A2 | 6/2003 |
| EP | 1 453 002 | | 9/2004 |
| EP | 1 453 030 | A1 | 9/2004 |
| FR | 2 611 389 | | 2/1987 |
| GB | 2 388 737 | | 11/2003 |
| JP | 01010299 | | 1/1989 |
| JP | 1-98383 | | 4/1989 |
| JP | 3-71111 | | 3/1991 |
| JP | 3-198026 | | 8/1991 |
| JP | 5-66501 | | 3/1993 |
| JP | 5-80716 | | 4/1993 |
| JP | 5-273523 | | 10/1993 |
| JP | 5-289044 | | 11/1993 |
| JP | 6-247623 | | 9/1994 |
| JP | 6-313018 | | 11/1994 |
| JP | 7-121120 | | 5/1995 |
| JP | 9-244548 | | 9/1997 |
| JP | 10-508120 | | 8/1998 |
| JP | 11-052412 | | 2/1999 |
| JP | 2002-099250 | | 4/2000 |
| JP | 2000-206488 | | 7/2000 |
| JP | 2000-275995 | | 10/2000 |
| JP | 2000-321571 | | 11/2000 |
| JP | 2001-142409 | | 5/2001 |
| JP | 2002-091385 | | 3/2002 |
| JP | 2003-204450 | | 7/2003 |
| JP | 2003-230010 | | 8/2003 |
| JP | 3523170 | | 2/2004 |
| JP | 2004-294540 | | 10/2004 |
| KR | 10-2004-0084777 | | 10/2004 |

| | | | |
|---|---|---|---|
| TW | 406206 | | 9/2000 |
| WO | WO 91/15843 | | 10/1991 |
| WO | WO 93/20660 | | 10/1993 |
| WO | WO 96/33483 | | 10/1996 |
| WO | WO 98/08134 | | 2/1998 |
| WO | WO 00/75720 | | 12/2000 |
| WO | WO 01/69584 | | 9/2001 |
| WO | WO 02/03687 | | 1/2002 |
| WO | WO 02/079862 | | 10/2002 |
| WO | WO 03/077013 | | 9/2003 |
| WO | WO 2004 013835 | | 2/2004 |
| WO | WO 2004013835 | A1 * | 2/2004 |

OTHER PUBLICATIONS

Paul E. Debevec and Jitendra Malik, “Recovering High Dynamic Range Radiance Maps from Photographs,” Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.

DiCarlo, J.M. and Wandell, B. (2000), “Rendering high dynamic range images,” in Proc. IS&T/SPIE Electronic Imaging 2000. Image Sensors, vol. 3965, San Jose, CA, pp. 392-401.

Kuang, J., Yamaguchi, H., Johnson, G.M. and Fairchild, M.D. (2004), “Testing HDR image rendering algorithms (Abstract),” in Proc. IS&T/SID Twelfth Color Imaging Conference: Color Science, Systems, and Application, Scottsdale, AR, pp. 315-320.

Durand, F. and Dorsey, J. (2002), “Fast bilateral filtering for the display of high dynamic-range images,” in Proc. ACM SIGGRAPH 2002, Annual Conference on Computer Graphics, San Antonia, CA, pp. 257-266.

Kang, S.B., Uyttendaele, M., Winder, S. And Szeliski, R. (2003), “High Dynamic Range Video,” ACM Transactions on Graphics 22(3), 319-325.

Brian A. Wandell and Louis D. Silverstein, “The Science of Color,” 2003, Elsevier Ltd, Ch. 8 Digital Color Reproduction, pp. 281-316.

Fumiaki Yamada and Yoichi Taira, “An LED backlight for color LCD,” IBM Research, Tokyo Research Laboratory, 1623-14, Shimotsuruma, Yamato, Kanagawa-ken 242-8502, Japan IDW’00, pp. 363-366.

Fumiaki Yamada, Hajime Nakamura, Yoshitami Sakaguchi, and Yoichi Taira,“52.2: Invited Paper: Color Sequential LCD Based on OCB with an LED Backlight,” Tokyo Research Laboratory, IBM Research, Yamato, Kanagawa, Japan, SID 00 Digest, pp. 1180-1183.

Ngai-Man Cheung, et al., “Configurable entropy coding scheme for H.26L,” ITU-Telecommunications Standardization Sector, Study Group 16 Question 6 Video Coding Experts Group (VCEG), Twelfth Meeting: Eibsee, Germany, Jan. 9-12, 2001, pp. 1-11.

* cited by examiner

LCD system configuration

Flashing backlight scheme to reduce the motion blur

Ghosting image from double flashing

Ghosting images in backlight flashing due to slower temporal response

Ghosting due to synchronization of LCD driving and backlight flashing

The effect of flashing timing on LCD output

The one-frame buffer non-recursive overdrive model

The one-frame buffer recursive overdrive model

Adaptive recursive overdrive algorithm optimized for backlight flashing

Overdrive value lookup

Driving waveform for measuring first order dynamic gamma

Measured first order dynamic gamma

Measured LCD display value as a function of previous display value and driving value

METHOD FOR OVERDRIVING A BACKLIT DISPLAY

CROSS-REFERENCE TO RELATED APPLICATIONS

This application claims the benefit of U.S. Provisional Application No. 60/653,912 filed Feb. 17, 2005 and U.S. Provisional Application No. 60/694,483 filed Jun. 27, 2005, each of which are incorporated by reference herein.

BACKGROUND OF THE INVENTION

The present invention relates to backlit displays and, more particularly, to a backlit display with improved performance characteristics.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to a viewer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transit of the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these points or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD, the optical axes of the first and second polarizers are arranged at an angle so that light passing through the first polarizer would normally be blocked from passing through the second polarizer in the series. However, a layer of the physical orientation of the molecules of liquid crystal can be controlled and the plane of vibration of light transiting the columns of molecules spanning the layer can be rotated to either align or not align with the optical axes of the polarizers. It is to be understood that normally white may likewise be used.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel. It is to be understood that the grooves may be omitted in some configurations.

To darken a pixel and create an image, a voltage, typically controlled by a thin-film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

LCDs can produce bright, high resolution, color images and are thinner, lighter, and draw less power than cathode ray tubes (CRTs). As a result, LCD usage is pervasive for the displays of portable computers, digital clocks and watches, appliances, audio and video equipment, and other electronic devices. On the other hand, the use of LCDs in certain "high end markets," such as video and graphic arts, is frustrated, in part, by the limited performance of the display.

Baba et al., U.S. Patent Publication No. 2002/0003522 A1 describe a display for a liquid crystal display that includes a flashing period for the backlight of the display that is based upon the brightness level of the image. In order to reduce the blurring an estimation of the amount of motion of the video content is determined to change the flashing width of the backlight for the display. To increase the brightness of the display, the light source of the backlight may be lighted with lower brightness in the non-lightening period than in the lightening period. However, higher brightness images requires less non-lightening period and thus tends to suffer from a blurring effect for video content with motion. To reduce the blurring of the image Baba et al. uses a motion estimation, which is computationally complex, to determine if an image has sufficient motion. For images with sufficient motion the non-lightening period is increased so that the image blur is reduced. Unfortunately, this tends to result in a dimmer image.

What is desired, therefore, is a liquid crystal display having reduced blur.

DETAILED DESCRIPTION OF PREFERRED EMBODIMENT

Figure 1A:
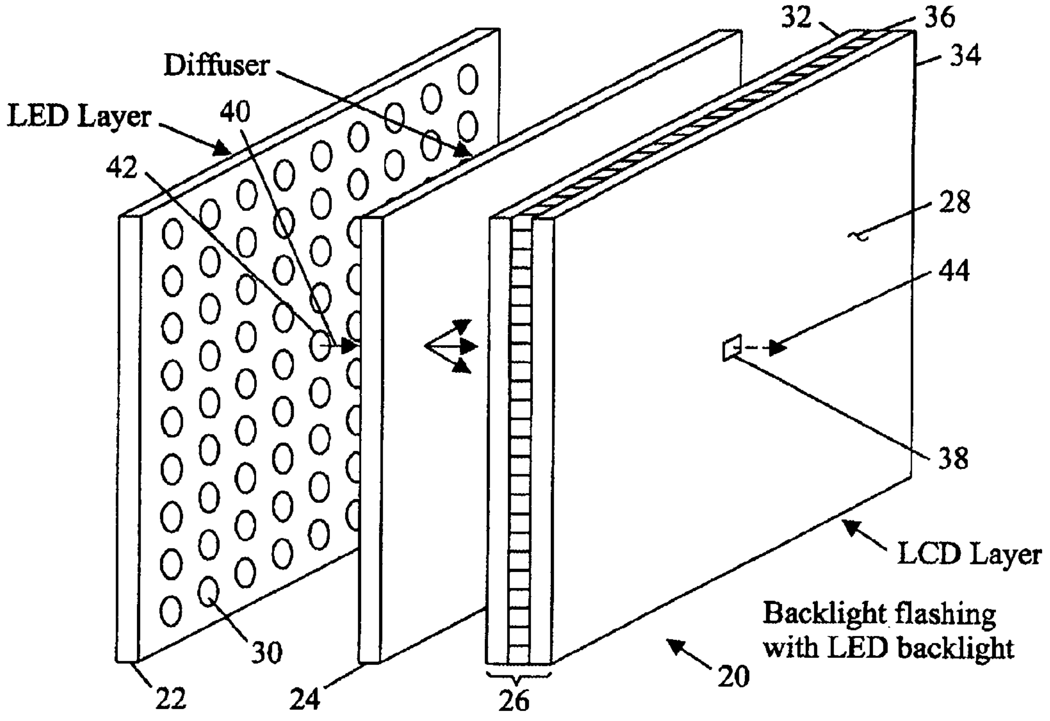
FIGS. 1A and 1B are schematic diagrams of liquid crystal displays (LCDs).
Figure 1B:
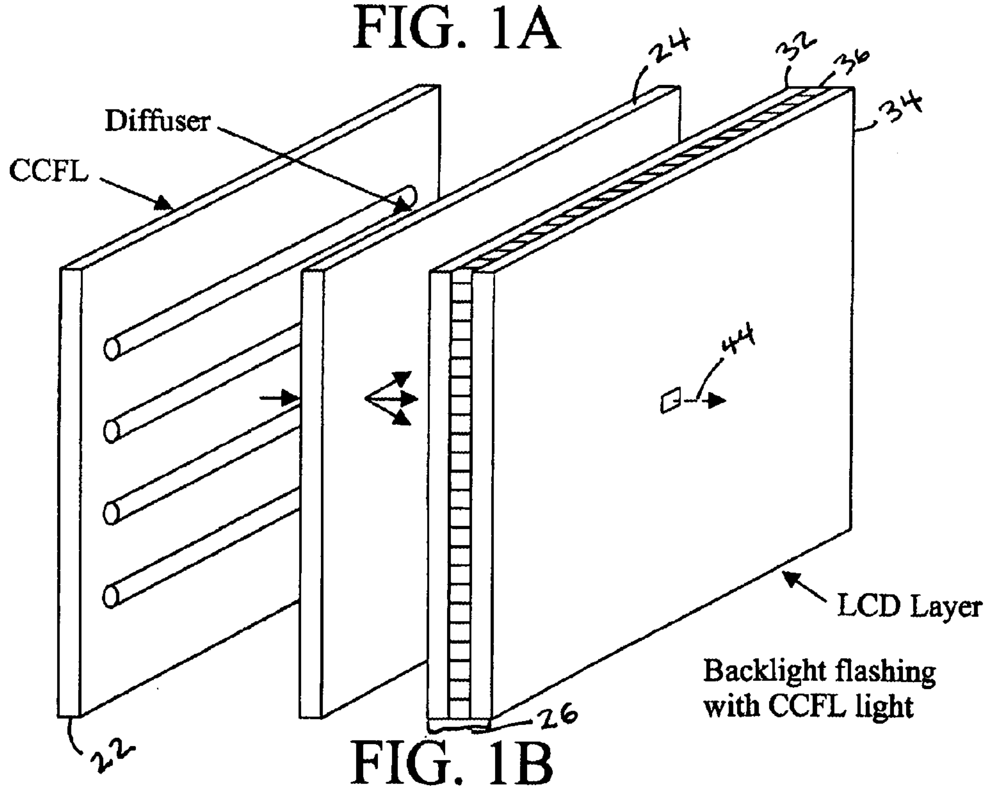

Referring to FIG. 1A, a backlit display 20 comprises, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The source of light for small and inexpensive LCDs, such as those used in digital clocks or calculators, may be light that is reflected from the back surface of the panel after passing through the panel. Likewise, liquid crystal on silicon (LCOS) devices rely on light reflected from a backplane of the light valve to illuminate a display pixel. However, LCDs absorb a significant portion of the light passing through the assembly and an artificial source of light such as the backlight 22 comprising fluorescent light tubes or an array of light sources 30 (e.g., light-emitting diodes (LEDs), as illustrated in FIG. 1A and fluorescent tubes as illustrated in FIG. 1B), are useful to produce pixels of sufficient intensity for highly visible images or to illuminate the display in poor lighting conditions. There may not be a light source 30 for each pixel of the display and, therefore, the light from the general point sources (e.g., LEDS) or general line sources (e.g., fluorescent tubes) is typically dispersed by a diffuser panel 24 so that the lighting of the front surface of the panel 28 is more uniform.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each successive molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 28 at the front surface of the display 28.

To darken the pixel 28, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 28 progressively darkens until the maximum extinction of light 40 from the light source 42 is obtained. Color LCD displays are created by varying the intensity of transmitted light for each of a plurality of primary color elements (typically, red, green, and blue) elements making up a display pixel. Other arrangements of structures may likewise be used.

The LCD uses transistors as a select switch for each pixel, and adopts a display method (hereinafter, called as a "hold-type display"), in which a displayed image is held for a frame period. In contrast, a CRT (hereinafter, called as an "impulse-type display") includes selected pixel that is darkened immediately after the selection of the pixel. The darkened pixel is displayed between each frame of a motion image that is rewritten in 60 Hz in case of the impulse-type display like the CRT. That is, the black of the darkened pixel is displayed excluding a period when the image is displayed, and one frame of the motion image is presented respectively to the viewer as an independent image. Therefore, the image is observed as a clear motion image in the impulse-type display. Thus, the LCD is fundamentally different from CRT in time axis hold characteristic in an image display. Therefore, when the motion image is displayed on a LCD, image deterioration such as blurring the image is caused. The principal cause of this blurring effect arises from a viewer that follows the moving object of the motion image (when the eyeball movement of the viewer is a following motion), even if the image is rewritten, for example, at 60 Hz discrete steps. The eyeball has a characteristic to attempt to smoothly follow the moving object even though it is discretely presented in a "hold type" manner.

However, in the hold-type display, the displayed image of one frame of the motion image is held for one frame period, and is presented to the viewer during the corresponding period as a still image. Therefore, even though the eyeball of the viewer smoothly follows the moving object, the displayed image stands still for one frame period. Therefore, the shifted image is presented according to the speed of the moving object on the retina of the viewer. Accordingly, the image will appear blurred to the viewer due to integration by the eye. In addition, since the change between the images presented on the retina of the viewer increases with greater speed, such images become even more blurred.

Figure 2:
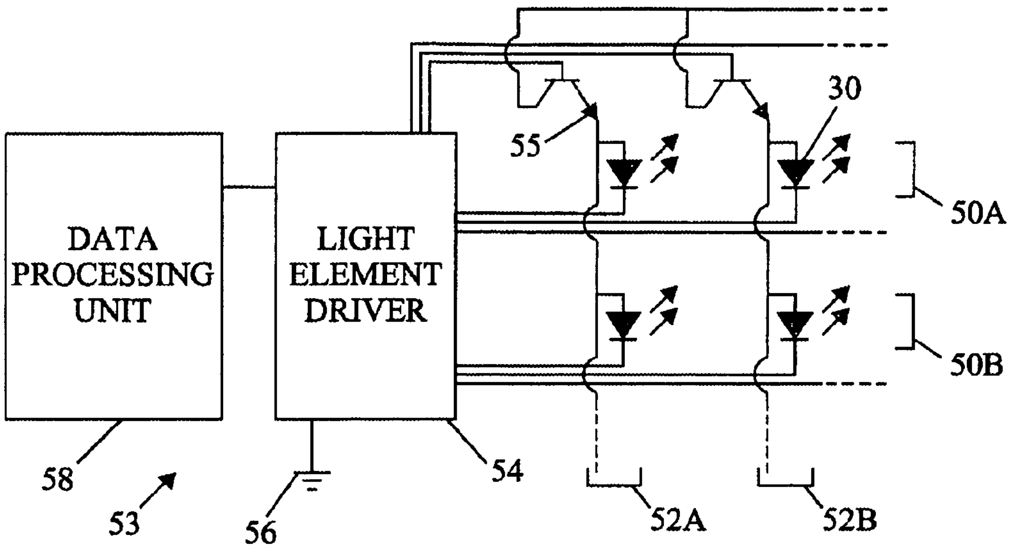
FIG. 2 is a schematic diagram of an exemplary driver for modulating the illumination of a plurality of light source elements of a backlight.

In the backlit display 20, the backlight 22 comprises an array of locally controllable light sources 30. The individual light sources 30 of the backlight may be light-emitting diodes (LEDs), an arrangement of phosphors and lensets, or other suitable light-emitting devices. In addition, the backlight may include a set of independently controllable light sources, such as one or more cold cathode ray tubes. The light-emitting diodes may be 'white' and/or separate colored light emitting diodes. The individual light sources 30 of the backlight array 22 are independently controllable to output light at a luminance level independent of the luminance level of light output by the other light sources so that a light source can be modulated in response to any suitable signal. Similarly, a film or material may be overlaid on the backlight to achieve the spatial and/or temporal light modulation. Referring to FIG. 2, the light sources 30 (LEDs illustrated) of the array 22 are typically arranged in the rows, for examples, rows 50*a* and 50*b*, (indicated by brackets) and columns, for examples, columns 52*a* and 52*b* (indicated by brackets) of a rectangular array. The output of the light sources 30 of the backlight are controlled by a backlight driver 53. The light sources 30 are driven by a light source driver 54 that powers the elements by selecting a column of elements 52*a* or 52*b* by actuating a column selection transistor 55 and connecting a selected light source 30 of the selected column to ground 56. A data processing unit 58, processing the digital values for pixels of an image to be displayed, provides a signal to the light driver 54 to select the appropriate light source 30 corresponding to the displayed pixel and to drive the light source with a power level to produce an appropriate level of illumination of the light source.

Figure 3:
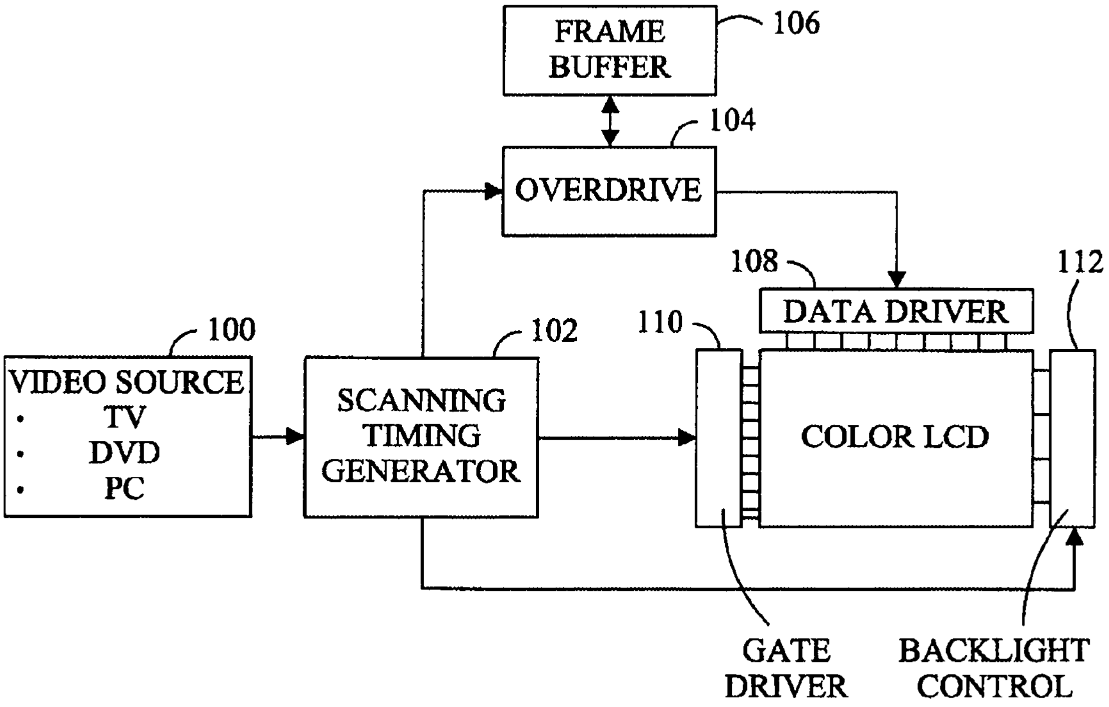
FIG. 3 illustrates an exemplary LCD system configuration.

FIG. 3 illustrates a block diagram of a typical data path within a liquid crystal panel. The video data 100 may be provided from any suitable source, such as for example, television broadcast, Internet connection, file server, digital video disc, computer, video on demand, or broadcast. The video data 100 is provided to a scanning and timing generator 102 where the video data is converted to a suitable format for presentation on the display. In many cases, each line of data is provided to an overdrive circuit 104, in combination with a frame buffer 106, to compensate for the slow temporal response of the display. The overdrive may be analog in nature, if desired. The signal from the overdrive 104 is preferably converted to a voltage value in the data driver 108 which is output to individual data electrodes of the display. The generator 102 also provides a clock signal to the gate driver 110, thereby selecting one row at a time, which stores the voltage data on the data electrode on the storage capacitor of each pixel of the display. The generator 102 also provides backlight control signals 112 to control the level of luminance from the backlight, and/or the color or color balance of the light provided in the case of spatially non-uniform backlight (e.g., based upon image content and/or spatially different in different regions of the display).

Figure 4:
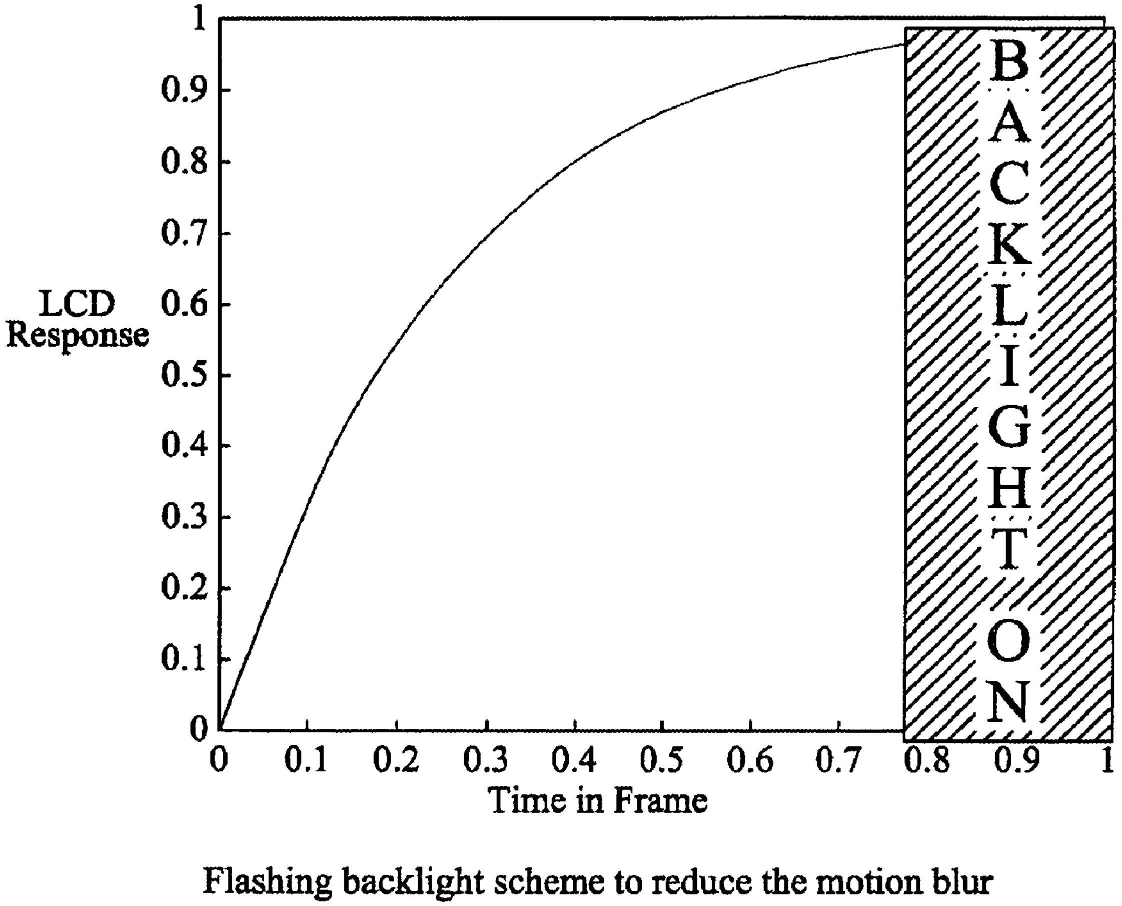
FIG. 4 illustrates an exemplary flashing backlight scheme.

The use of the overdrive circuit 104 tends to reduce the motion blur, but the image blur effects of eye tracking the motion while the image is held stationary during the frame time still causes a relative motion on the retina which is perceived as motion blur. One technique to reduce the perceived motion blur is to reduce the time that an image frame is displayed. FIG. 4 illustrates the effect of flashing the backlight during only a portion of the frame. The horizontal axis represents the elapsed time during a frame and the vertical axis represents a normalized response of the LCD during the frame. It is preferable that the flashing of the backlight is toward the end of the frame where the transmission of the liquid crystal material has reached or otherwise is approaching the target level. For example, the majority of the duration of the flashing backlight is preferably during the last third of the frame period. While modulating the backlight in some manner reduces the perceived motion blur, it unfortunately tends to result in a flickering artifact, due to the general 'impulse' nature of the resulting display technique. In order to reduce the flickering, the backlight may be flashed at a higher rate.

Figure 5:
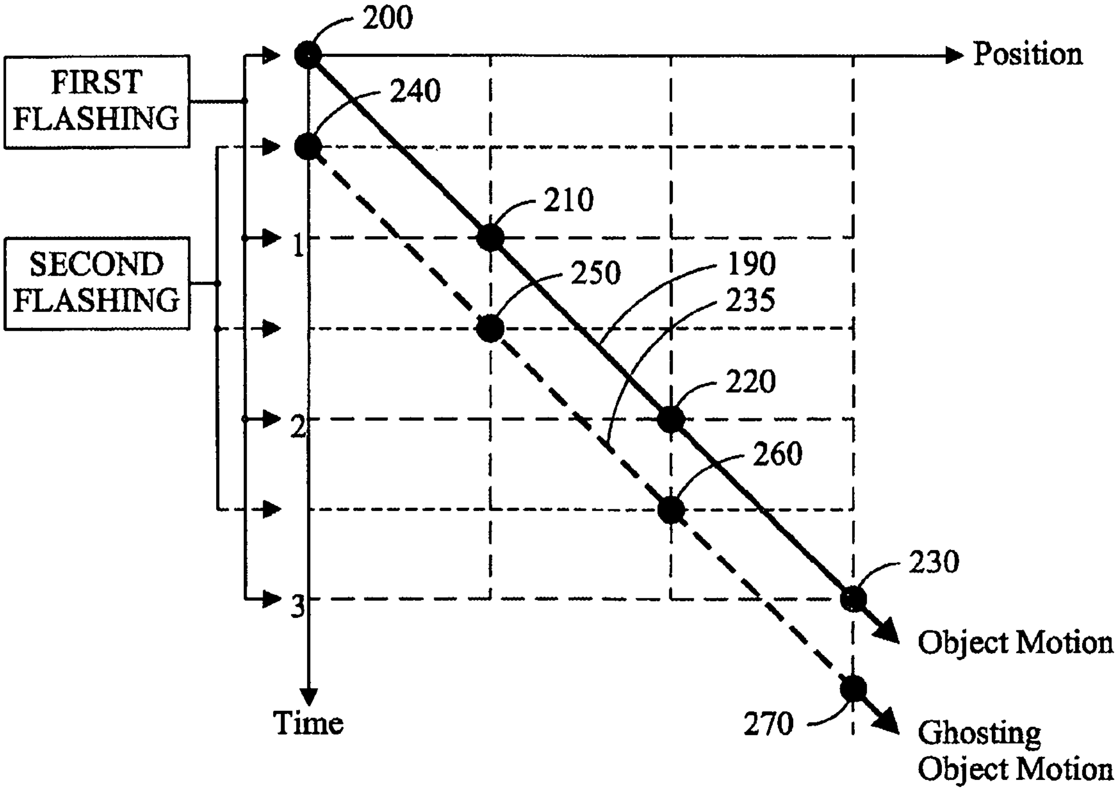
FIG. 5 illustrates image ghosting.

While flashing the backlight at a higher rate may seemingly be a complete solution, unfortunately, such higher rate flashing tends to result in "ghosted images". Referring to FIG. 5, a graph of the motion of a portion of an image across a display over time is illustrated. With the first flashing of a frame at the frame rate, as illustrated by the solid line 190, the image would appear to the user at each time interval (e.g., frame rate). In particular, the image would appear at position 200 at the end of the first frame, is shifted and would appear at position 210 at the end of the second frame, is shifted and would appear at position 220 at the end of the third frame, and is shifted and would appear at position 230 at the end of the fourth frame. Accordingly, the moving image would be 'flashed' to the viewer at four different times corresponding to four different positions.

When a second flash is included at the frame rate it may be centrally timed during the frame, and is illustrated by the dashed line 235. The image would appear to the user at each time interval central to the frame. In particular the image would appear at position 240 at the middle of the first frame, is shifted and would appear at position 250 at the middle of the second frame, is shifted and would appear at position 260 at the middle of the third frame, and is shifted and would appear at position 270 at the middle of the fourth frame. Accordingly, the moving image would be 'flashed' to the viewer at four additional different times corresponding to four different positions.

With the combination of the first flashing and the second flashing during each frame, the ghosting of the image results in relatively poor image quality with respect to motion. One technique to reduce the effect of blurring is to drive the liquid crystal display at the same rate as the backlight together with motion compensated frame interpolation. While a plausible solution, there is significant increased cost associated with the motion estimate and increased frame rate.

Figure 6A:
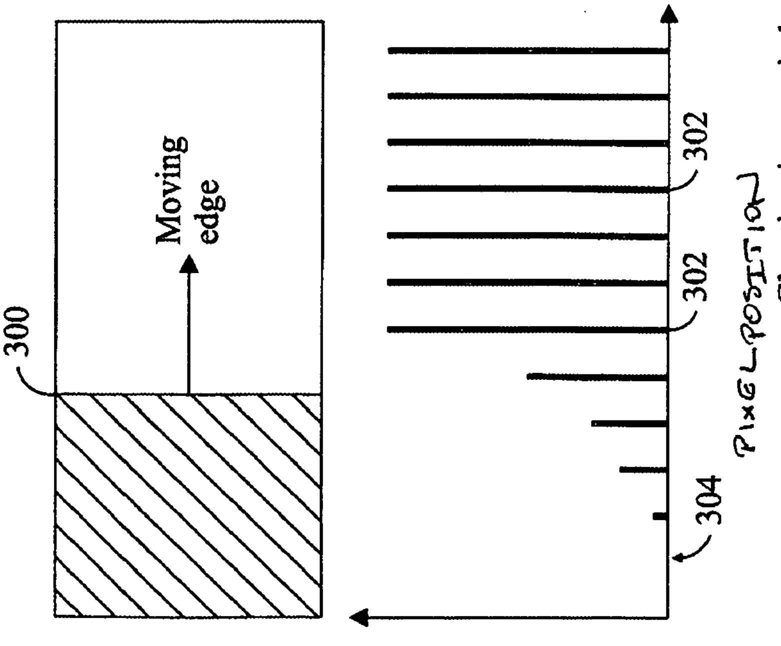
FIGS. 6A and 6B further illustrate image ghosting.
Figure 6B:
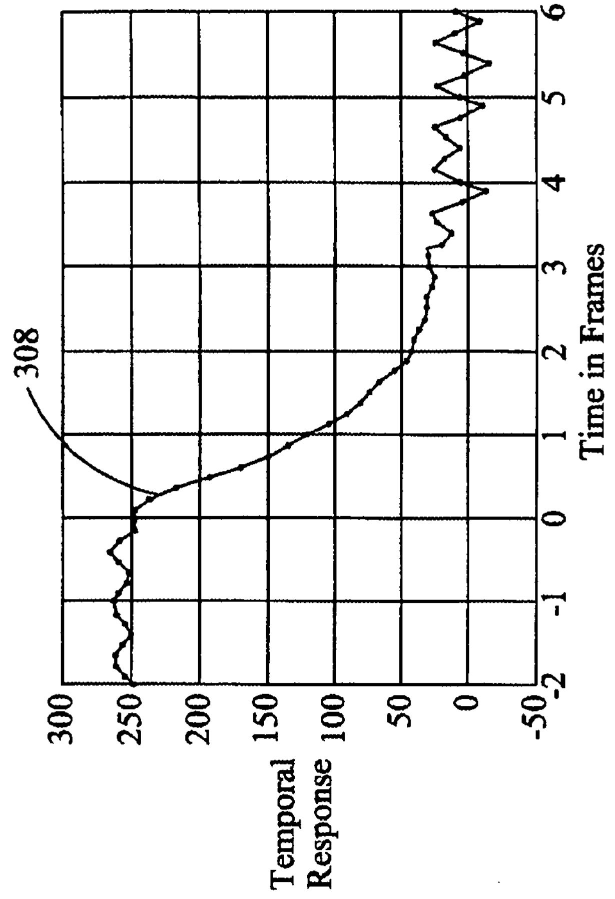

Another type of ghosting is due to the relatively slow temporal response of the liquid crystal display material as illustrated in FIGS. 6A and 6B. FIG. 6A illustrates the moving edge 300 with the resulting pixel luminance shown as a 'snapshot'. As the edge 300 moves from the left to right (or any other direction), the liquid crystal display pixels turn from a white level 302 (e.g., one state) to a black level 304 (e.g., another state). Due to the slow temporal response, in relation to the frame period, it may take multiple frame periods for the LCD to reach the desired black level, as illustrated by the temporal response curve 308 illustrated in FIG. 6B. Accordingly, the flashing of the backlight at the end of the frame may result in multiple spatially displaced decreasing luminance levels, as illustrated in FIG. 6A. The edges in the video are sharp edges, but the resulting image presented on the liquid crystal display tend to be blurred because of the slow temporal response characteristics shown in FIG. 6B.

Figure 7B:
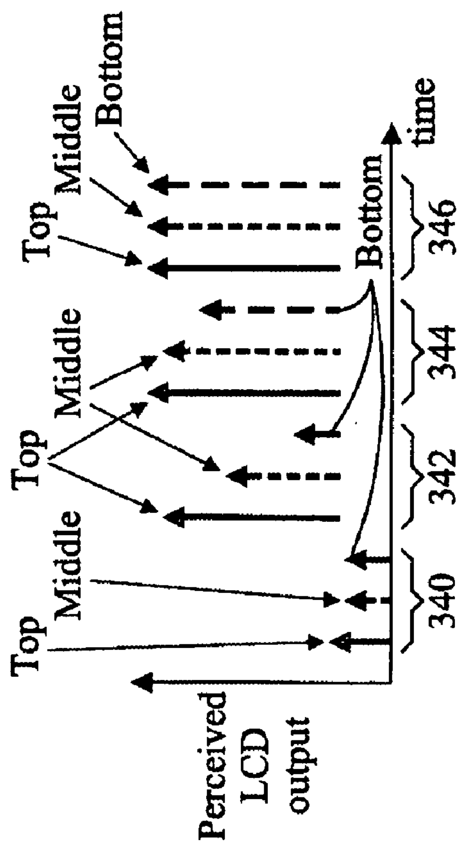
FIGS. 7A and 7B illustrate ghosting.
Figure 7A:
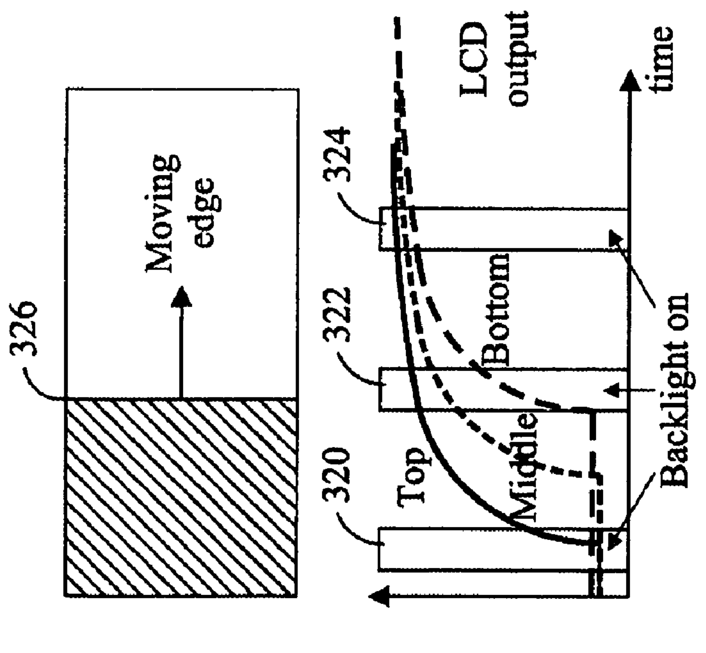

Another type of ghosting is due to the temporal timing differences between the LCD row driving mechanism and the flashing of the entire backlight. Typically, the LCD is driven one row at a time from the top to the bottom. Then the flashing of the backlight for all rows would be simultaneously done at the end of the frame. Referring to FIG. 7A, a moving edge 326 is illustrated with the resulting pixel luminance shown as a 'snapshot'. The backlight is shown flashing once during each frame 320, 322, and 324 and during this time a vertical edge 326 is moving across the display. The data at the top of the display is provided before the data in the middle of the display, which is provided before the data in the lower portion of the display. The middle flashing backlight 322 illustrates that the data at the top of the display has had a greater time period during which to move toward its final value than the data at the middle of the display where the data at the bottom of the display has the least amount of time to move toward its final value. Accordingly, while the same data may be provided across a vertical column of data, the resulting output observable to a viewer during the flashing backlight is different because of the different temporal periods between writing the data and viewing the resulting data. This is most clearly illustrated in FIG. 7B, having the same temporal scale, by the first frame 340 having the output from the top, middle, and bottom being essentially the same; the second frame 342 having the output from the top, middle, and bottom being substantially different (with the top being substantially on, the middle being about ½ on, and the bottom being mostly off); the third frame 344 having the output from the top, middle, and bottom still being substantially different (with the top being substantially on, the middle being substantially on albeit slightly less, and the bottom being somewhat on albeit even slightly lower than the middle); and the fourth frame 346 where the top, middle, and bottom being substantially the same. Hence, the images will tend to exhibit ghosting that spatially varies across the display.

The spatial variance is generally related to the scanning process of providing data to the display. To reduce this temporal spatial effect, one potential technique includes modification of the timing of the backlight illumination for different regions of the display so as to reduce the effects of the temporal spatial effect.

Figure 8:
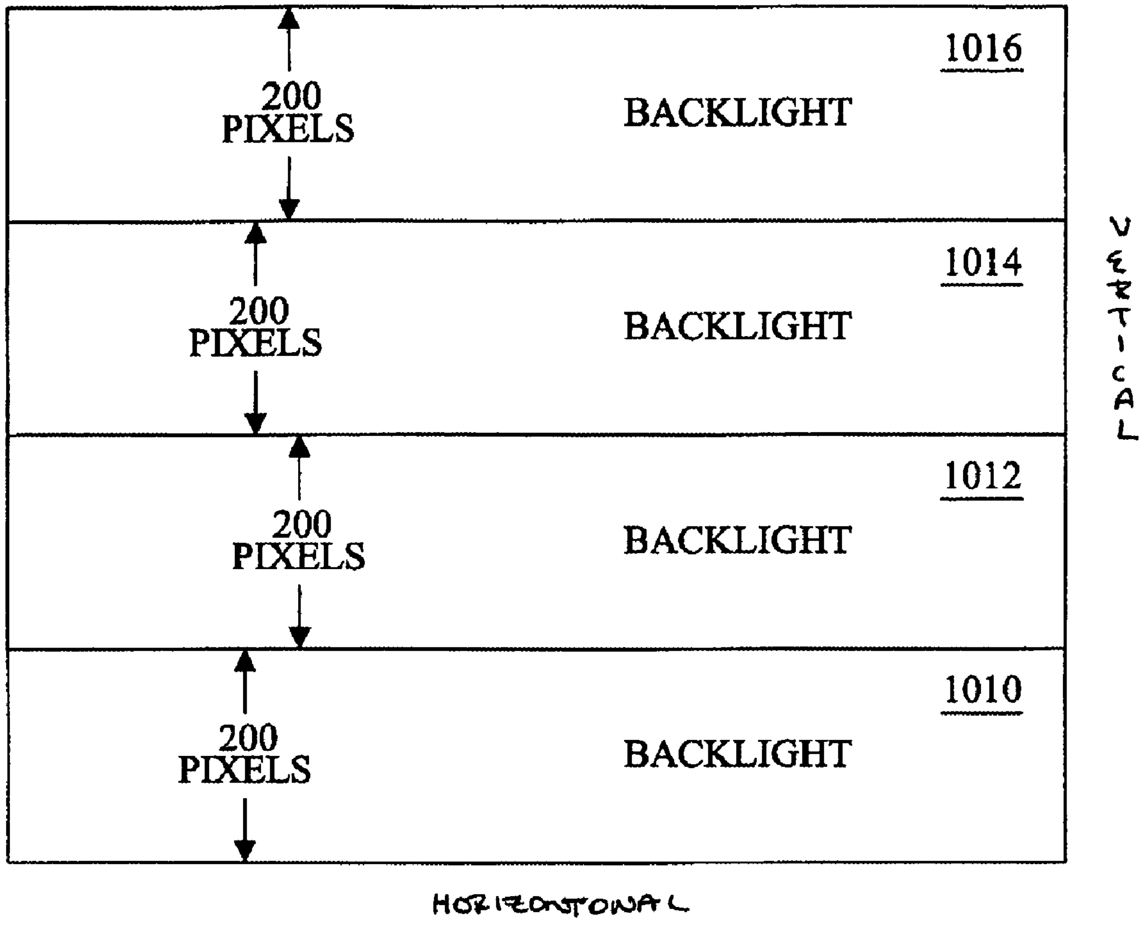
FIG. 8 illustrates an exemplary segmented backlight.
Figure 9:
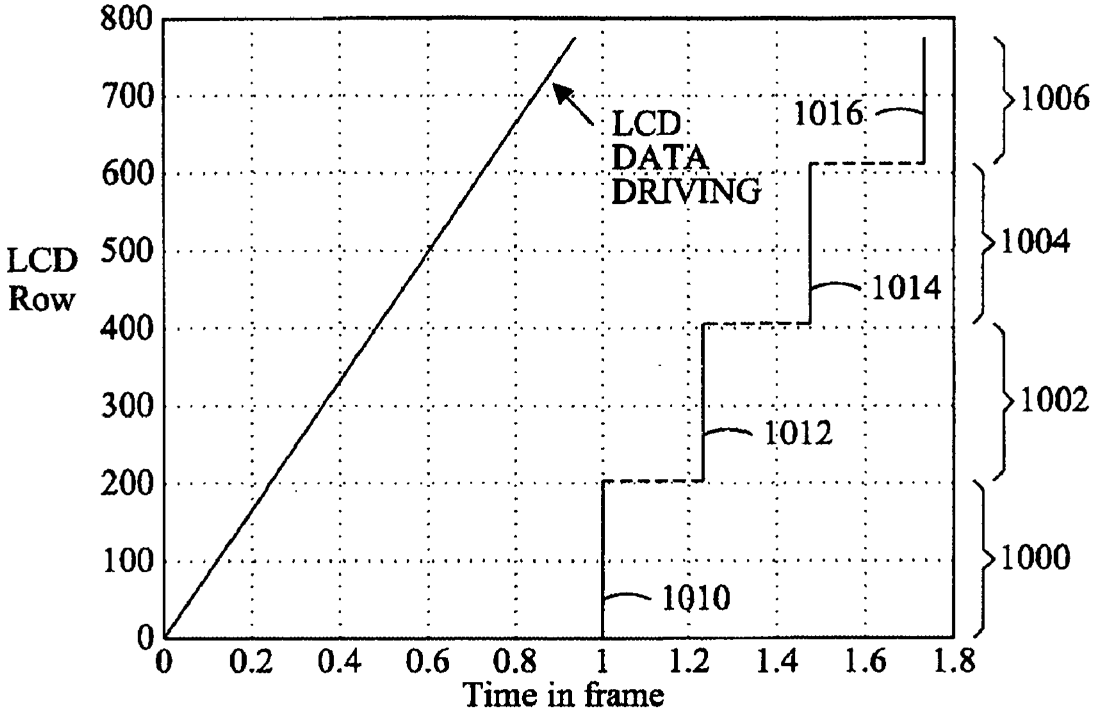
FIG. 9 illustrates LCD a temporal relationship between data driving and backlight flashing.

Referring to FIG. 8, illustrating a rectangular backlight structure of the display, the backlight may be structured with a plurality of different regions. For example, the backlight may be approximately 200 pixels (e.g., 50-400 pixel regions) wide and extend the width of the display. For a display with approximately 800 pixels, the backlight may be composed of, for example, 4 different backlight regions. In other embodiments, such as an array of light emitting diodes, the backlight may be composed of one or more rows of diodes, and/or one or more columns of diodes, and/or different areas in general. Referring to FIG. 9, the last backlight region is typically flashed at the end of the previous frame. The first 200 rows are sequentially addressed with data 1000 for the corresponding image to be displayed. The second 200 rows are sequentially addressed with data 1002 for the corresponding image to be displayed. The third 200 rows are sequentially addressed with data 1004 for the corresponding image to be displayed. The fourth 168 rows are sequentially addressed with data 1006 for the corresponding image to be displayed.

Figure 10:
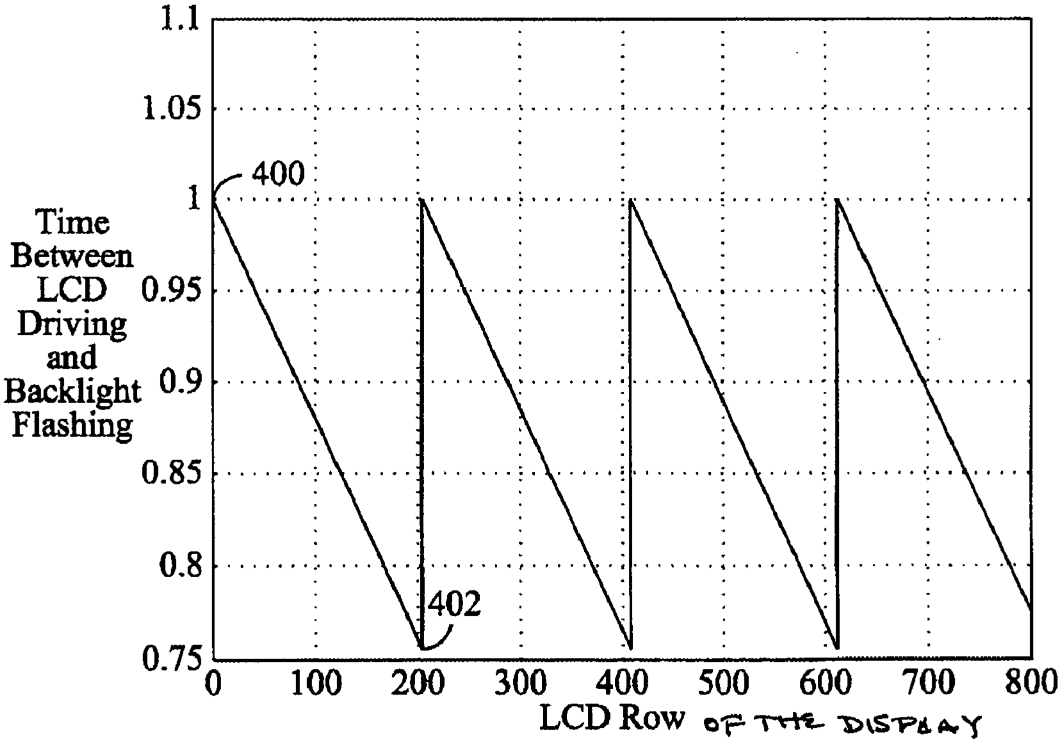
FIG. 10 illustrates the time between LCD driving and backlight flashing.

During the next frame, the first backlight 1010 that is associated with the data 1000 is flashed at the beginning of the frame. The second backlight 1012 that is associated with the data 1002 is flashed at the at a time approximately 20% of the duration of the frame. The third backlight 1014 that is associated with the data 1004 is flashed at the at a time approximately 40% of the duration of the frame. The fourth backlight 1016 that is associated with the data 1006 is flashed at the at a time approximately 80% of the duration of the frame. In this manner, it may be observed that the different backlight regions 1010, 1012, 1014, and 1016 are flashed at temporally different times during the frame. The result of this temporal flashing in general accordance with the writing of the data to the display is that the average time and/or medium time period between the writing of the data to the display and the flashing of the backlight may be characterized as less. Also, the result of this temporal flashing in general accordance with the writing of the data to the display may be characterized as the standard deviation between the writing of the data to the display and the flashing of the backlight is decreased. While an improvement in performance may occur with the modified backlight illumination technique, there still exists a significant difference between the illumination of a group of rows. FIG. 10 illustrates the time between the driving of the data to the liquid crystal display for each region and the illumination of the corresponding backlight for that region. With reference also to FIGS. 8 and 9, the transition starts with a time period of 1.0 (400) and decreases to a time period of 0.75 (402), for each region. This transition period repeats itself at rows 200-399, 400-599, and 600-768. FIG. 10 illustrates the repetitive nature of the transitions and the difference in the time for the liquid crystal material to respond between backlight illuminations, which in turn results in differences in the anticipated luminance levels of the associated pixels during each transition.

Figure 11:
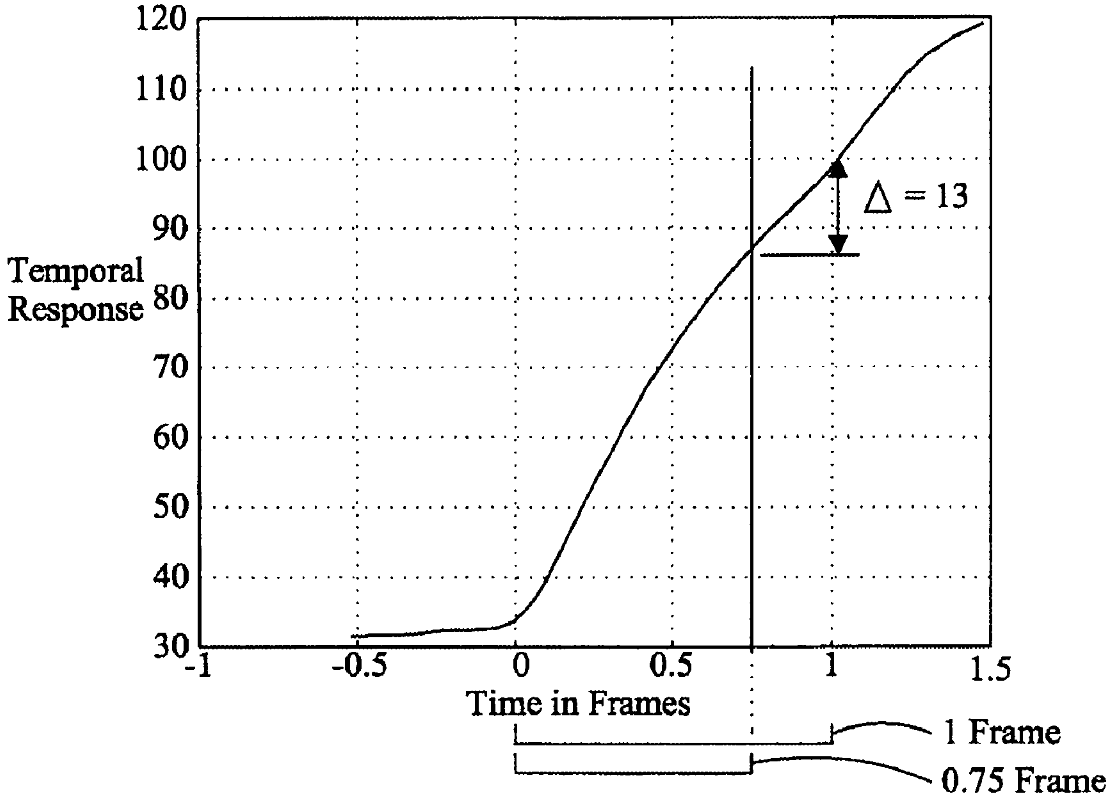
FIG. 11 illustrates the effect of flashing timing on LCD output.

Referring to FIG. 11, a measured response from a luminance level of 32 at the start of a frame to a luminance level of 100 at the end of the frame is illustrated for a desired transition from levels 32 to 100. It may be observed that this transition requires the entire time of the frame to complete with the given drive system. When the available duration is only 0.75 of a frame duration (see FIG. 10) then the measured response from at level of 32 at the start of the frame to a level at 0.75 of a frame duration is 87, as opposed to the desired 100. There exists a difference of 13 levels, and accordingly when provided only 0.75 of a frame for the transition, the corresponding pixels do not reach the same brightness as those having 1.0 of a frame for the transition. An exemplary aspect of the system provides that the overdrive system could be adapted to provide different overdrive to different pixels of a region corresponding to a backlight or a region of the image. In this manner, pixels which are not anticipated to reach the desired level within a frame due to temporal time differences between illuminations relative to other pixels can be provided with overdrive. By way of example, this overdrive may be provided across the entire display or otherwise for each backlight flashing region.

Figure 12:
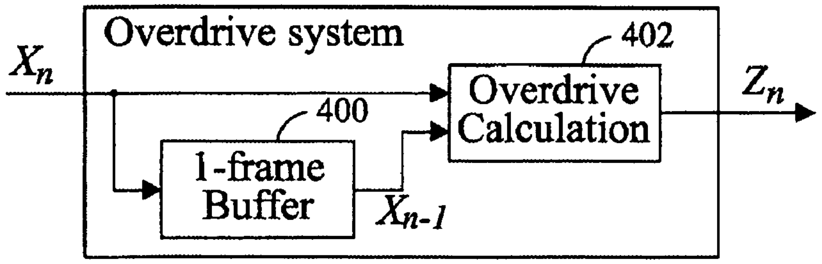
FIG. 12 PRIOR ART
FIG. 12 illustrates an exemplary prior-art one-frame buffer overdrive.

A typical implementation structure of the conventional overdrive (OD) technology is shown in FIG. 12. The implementation includes one frame buffer 400 and an overdrive module 402. The frame buffer stores previous target display value $x_{n-1}$ of driving cycle n−1. The overdrive module, taking current target display value $x_n$ and previous display value $x_{n-1}$ as input, derives the current driving value $z_n$ to make the actual display value $d_n$ the same as the target display value $x_n$.

In a LCD panel, the current display value $d_n$ is preferably not only determined by the current driving value $z_n$, but also by the previous display value $d_{n-1}$. Mathematically, $$d_n=f_d(z_n,d_{n-1}) \quad (1)$$

To make the display value $d_n$ reach the target value $x_n$, overdriving value $z_n$ should be derived from Equation (1) by making $d_n$ to be target value $x_n$. The overdriving value $z_n$ is determined in this example by two variables: the previous display value $d_{n-1}$ and the current driving values $x_n$, which can be expressed by the following function mathematically:

$$z_n=f_z(x_n,d_{n-1}) \quad (2)$$

Equation (2) shows that two types of variables: target values and display values, are used to derive current driving values. In many implementations, however, display values are not directly available. Instead, the described one-frame-buffer non-recursive overdrive structure assumes that every time the overdrive can drive the display value $d_n$ to the target value $x_n$. Therefore, Equation (2) can readily be simplified as $$z_n=f_z(x_n,x_{n-1}) \quad (3)$$

In Equation (3), only one type of variable: target values, is needed to derive current driving values, and this valuable is directly available without any calculation. As a result, Equation (3) is easier than Equation (2) to implement.

In many cases, the assumption is not accurate in that after overdrive, the actual value of a LC pixel $d_{n-1}$ is always the target value $x_{n-1}$, i.e., it is not always true that $d_{n-1}=x_{n-1}$. Therefore, the current OD structure defined by Equation (3) may be in many situations an over-simplified structure.

Figure 13:
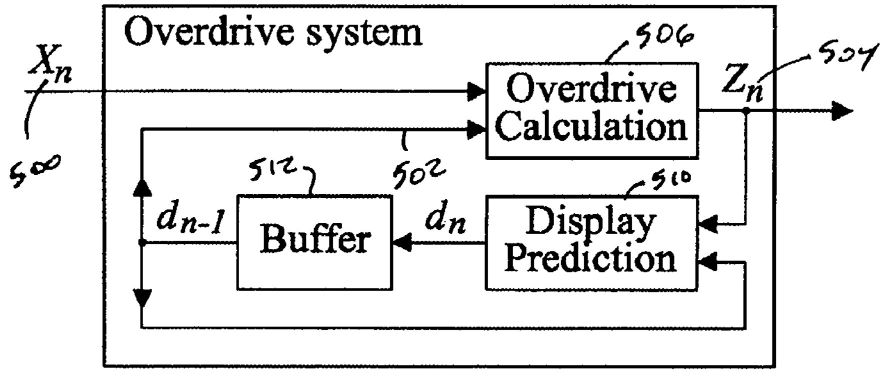
FIG. 13 illustrates another one-frame buffer overdrive.

To reduce the problem that the target value is not always reached by overdrive, a recursive overdrive structure as shown in FIG. 13 may be used. The image data 500 is received which is used together with recursive data 502 to calculate 506 the overdrive 504. A prediction of the display characteristics 510 uses the feedback from a frame buffer 512 and the overdrive 504. There are two calculation modules in the recursive overdrive. Besides the one utilizing Equation (1), another module utilizes Equation (2) to estimate the actual display value $d_n$.

Figure 14:
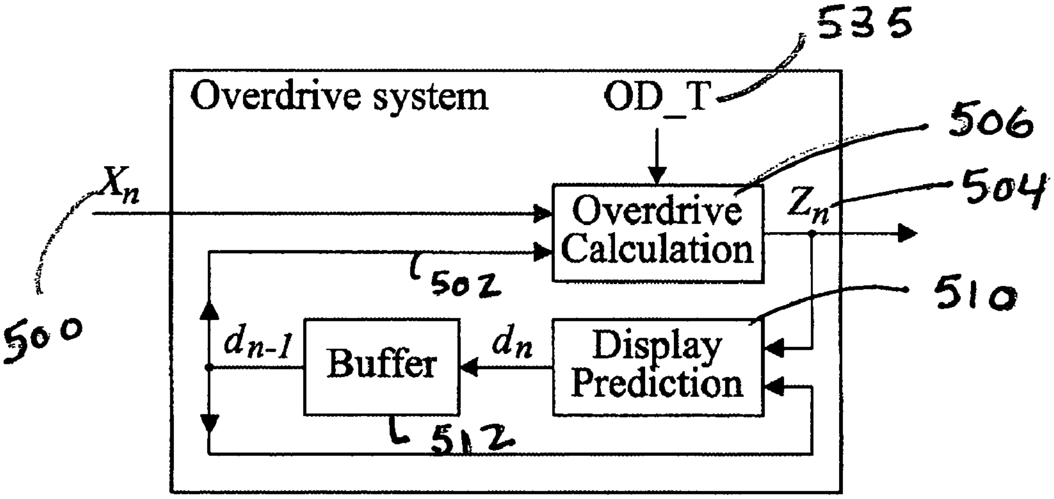
FIG. 14 illustrates an adaptive recursive overdrive.

A further modified Adaptive Recursive Overdrive (AROD) can be implemented to compensate for timing errors. The AROD is modified recursive overdrive (ROD) technique taking into account the time between the LCD driving and flashing, i.e. OD_T 535 as illustrated in FIG. 14.

Figure 15:
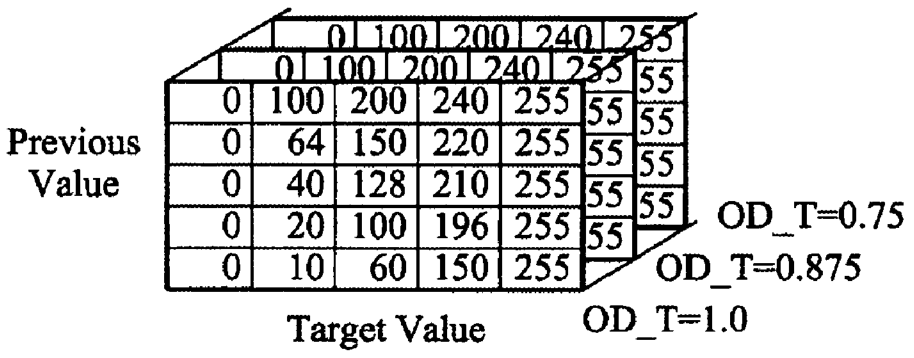
FIG. 15 illustrates an exemplary overdrive value lookup.

In many cases, it is desirable to include an exemplary three-dimensional lookup table (LUT) as shown in FIG. 15. The previous value from the buffer, the target value from video signal, and the OD_T 535, which in many configurations is row dependent, are used to derive the OD value. Since the OD_T 535 is preferably only dependent on the row number, a two-dimensional overdrive table for each row is generated using a one-dimensional interpolation in the OD_T axis. Once an overdrive table which is adapted for the particular OD_T 535 has been determined, the system may overdrive the entire line using the recursive OD algorithm as shown in FIG. 14. The computational cost is similar to that of the recursive overdrive.

Values for the overdrive table can be derived from a measured LCD temporal response. The concept of dynamic gamma may be used to characterize the LCD temporal response function. The dynamic gamma describes dynamic input-output relationship of an LC panel during transition times and it is the actual luminance at a fixed time point after a transition starts.

To reduce the influence of disparity of different LC panels, the measured actual display luminance of an LC panel is normalized by its static gamma. More specifically, the measured data are mapped back through the inverse static gamma curve to the digit-count domain (0-255 if LC panel is 8-bit).

Figure 16:
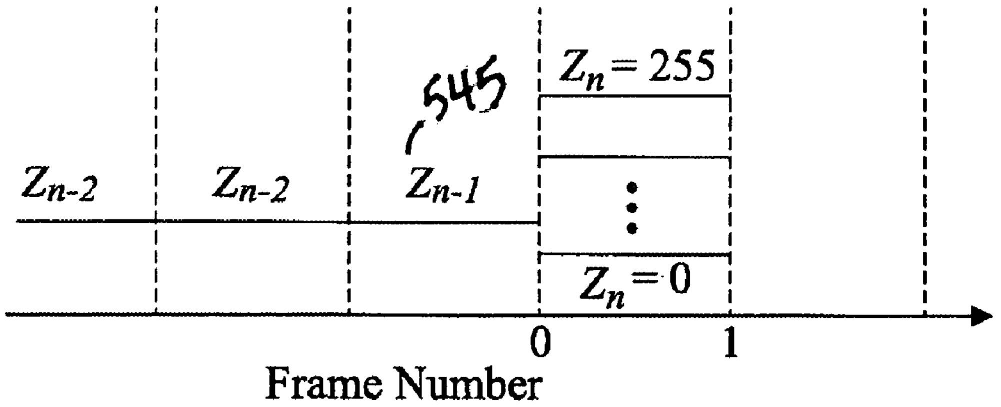
FIG. 16 illustrates an exemplary driving waveform for dynamic gamma.
Figure 17:
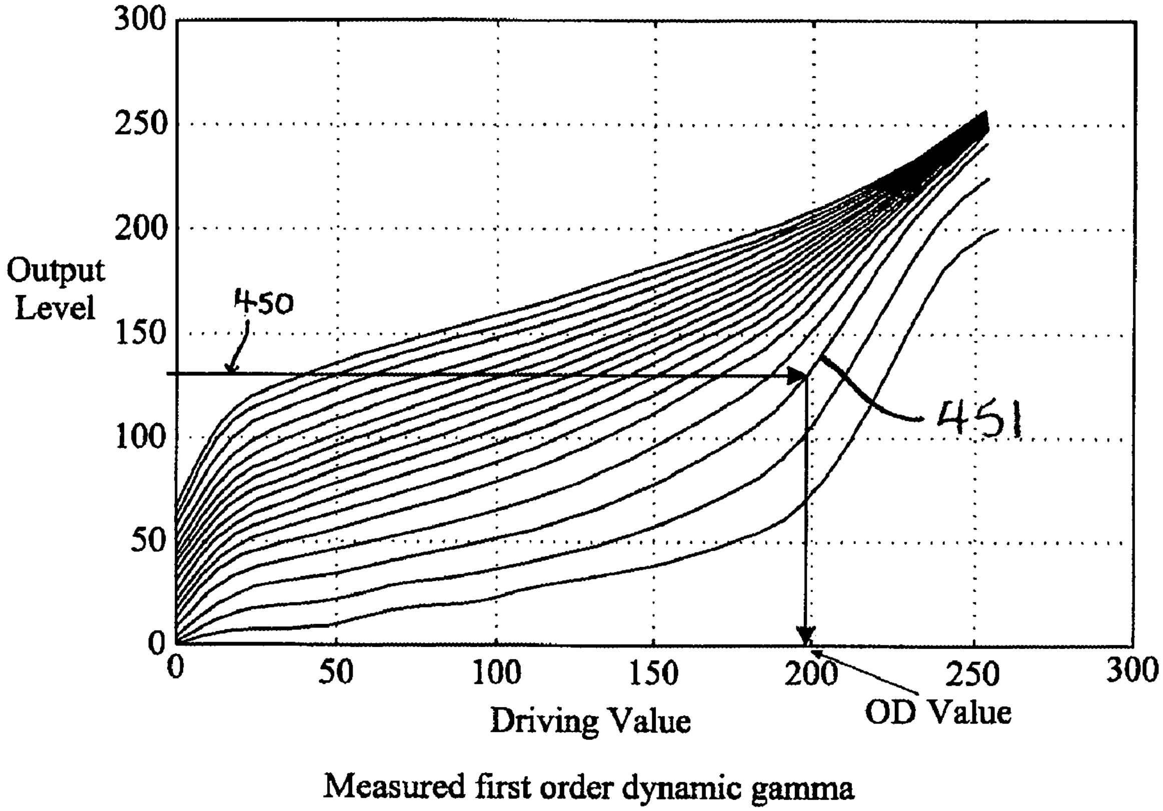
FIG. 17 illustrates the measured first order dynamic gamma.

The measurement system for dynamic gamma may include a driving input is illustrated in FIG. 16. A set of frames Z are illustrates together with a driving waveform. Before frame 0, the driving value $z_{n-1}$ 545 is applied for several cycles to make the pixel into equilibrium state. Then, in the frame 0, different driving value $z_n$, covering the driving range (from 0 to 255 for 8-bit LC panel), is applied, and the corresponding luminance is measured exactly at a time T, T−delta, and T+delta. FIG. 17 shows a measured dynamic gamma for a LCD at one panel temperature (8° C.) at T=1. For each T value, a set of dynamic gamma curves can be derived from the measured temporal response curve.

Overdrive table values can be derived from the dynamic gamma data as illustrated in FIG. 17 with the output levels and driving value curves from a starting point to an ending point. To determine an overdrive value for a transition, such as 32 to 128, the system first determines the dynamic gamma curve corresponding to the previous LCD level, which in this case is the curve 451 indicated by the arrow 450, and then interpolate the driving value to have the output of 128 as shown in FIG. 17.

Figure 18:
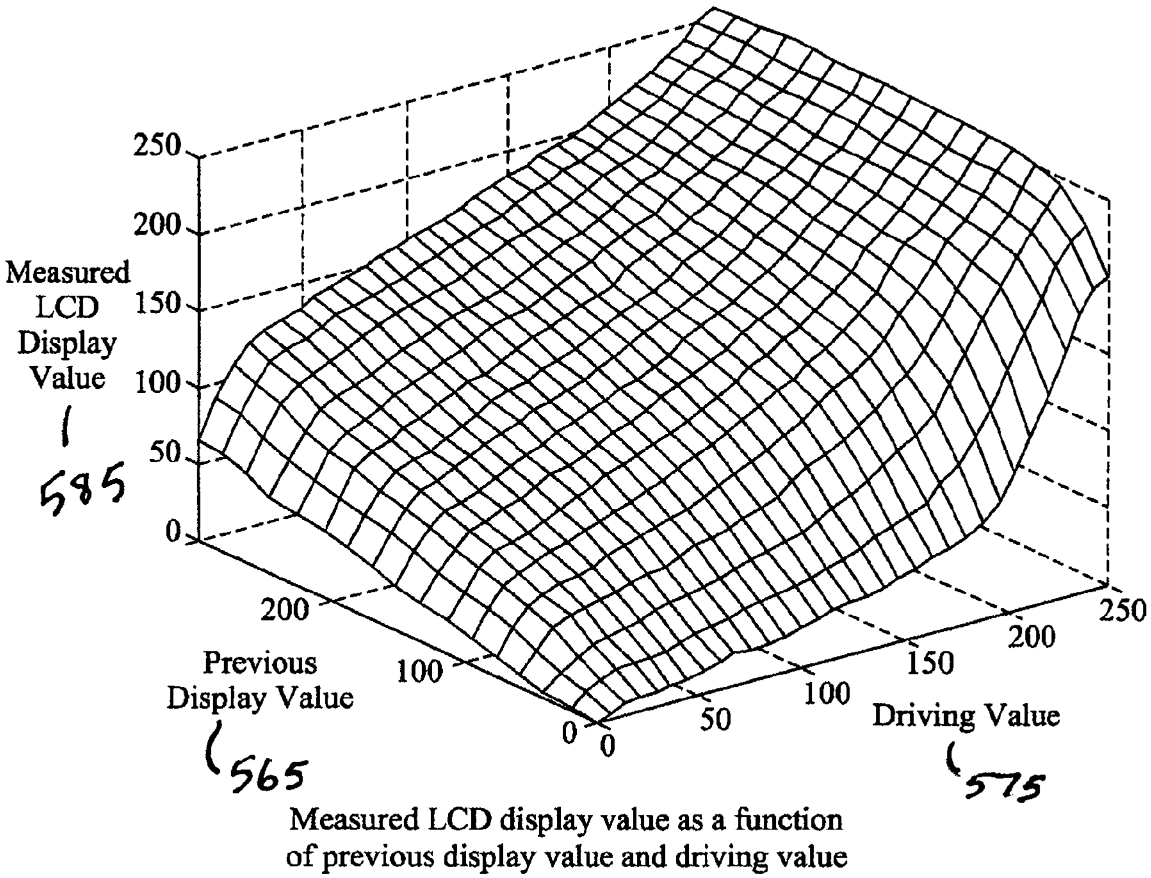
FIG. 18 illustrates the measured LCD display values.

By using dynamic gamma from different T values, a set of overdrive tables can be derived. The model table (the table used to predict the actual LCD output at the end of frame) is the same as recursive overdrive case. FIG. 18 shows a 3D plot of dynamic gamma as a function of previous display value and driving value. A previous display value 565 is matched to the current driving value 575 to determine what the display value of the luminance is likely to be 585. The predicted LCD output is interpolated from measured LCD output levels shown in FIG. 18. Unlike the overdrive table which is flashing dependent, the model table is only dependent on the LCD driving, thus the dynamic gamma for the model table is measured at T=1.

All the references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for displaying an image on a liquid crystal display including first and second light valves, each in a respectively different region of said display, said method comprising:

(a) receiving an image signal;

(b) recursively overdriving said first light valve based upon sequential values retrieved from a first look-up table; and (c) recursively overdriving said second light valve based upon sequential values retrieved from a second look-up table; where (d) said first and second look-up tables are respectively produced by interpolation along one axis of a 3-dimensional table stored in memory accessible to said liquid crystal display, where said three-dimensional table provides respective values for the output response of said first and second light valves, respectively, as a function of a variable driving value for a current frame, a variable driving value for a previous frame, and a variable response time of said first and second light valves, each variable represented on an axis of said three-dimensional table.

2. The method of claim 1 wherein said interpolation is along an axis representing said variable response time of said first and second light valves.

3. The method of claim 1 wherein said first and second light valves are both illuminated by the same respective one of a plurality of backlight elements sequentially activated to be generally synchronous with a writing signal to said liquid crystal display.

4. The method of claim 1 wherein said display includes a plurality of backlights.

5. The method of claim 1 wherein said display is illuminated with a plurality of backlights in a temporally spaced manner during a frame.

6. A method for displaying an image on a display including a light valve comprising:

(a) receiving an image signal; and (b) modifying a first pixel of said light valve with a first overdrive signal for said first pixel of said light valve changing from a first value to a second value, said first overdrive signal different than a second overdrive signal for a second pixel of said light valve changing from said first value to said second value, wherein said display includes a plurality of light emitting diodes forming a backlight providing light to said light valve, where said overdrive signal is based on a pre-determined dynamic gamma of said display representing the dynamic input-output relationship of said display as a function of a variable transition time between said first value and said second value, and wherein said dynamic gamma is represented in a three-dimensional lookup table stored in memory accessible to said liquid crystal display and used to calculate overdrive values, where said three-dimensional table provides respective values for the output response of said first and second light valves, respectively, as a function of a variable driving value for a current frame, a variable driving value for a previous frame, and a variable response time of said first and second light valves, each variable represented on an axis of said three-dimensional table.

7. A method for displaying an image on a liquid crystal display including first and second light valves, each in a respectively different region of said display, said method comprising:

(a) receiving an image signal;

(b) overdriving said first light valve based upon sequential values determined from a three-dimensional look-up table and stored in a first frame buffer, where said three-dimensional table provides respective values for the output response of said first and second light valves, respectively, as a function of a variable driving value for a current frame, a variable driving value for a previous frame, and a variable response time of said first and second light valves, each variable represented on an axis of said three-dimensional table;

(c) overdriving said second light valve based upon sequential values determined from said look-up table and stored in a second frame buffer; and (d) simultaneously illuminating said first pixel and said second pixel while not illuminating at least one other pixel of said display; where (e) said values determined from said look-up table are automatically calculated based on an interpolation along an axis of said look-up table, said axis representing the temporal response of a backlight of said display measured at sequential intervals over a frame cycle of said display.

* * * * *